(12) United States Patent
Vadekar et al.

(10) Patent No.: US 7,020,281 B2
(45) Date of Patent: Mar. 28, 2006

(54) TIMING ATTACK RESISTANT CRYPTOGRAPHIC SYSTEM

(75) Inventors: Ashok Vadekar, Rockwood (CA); Robert J. Lambert, Cambridge (CA)

(73) Assignee: Certicom Corp., Mississauga (CA)

( * ) Notice: Subject to any disclaimer, the term of this patent is extended or adjusted under 35 U.S.C. 154(b) by 564 days.

(21) Appl. No.: 09/761,700

(22) Filed: Jan. 18, 2001

(65) Prior Publication Data
US 2001/0033655 A1    Oct. 25, 2001

Related U.S. Application Data
(63) Continuation of application No. PCT/CA99/00658, filed on Jul. 21, 1999.

(30) Foreign Application Priority Data
Jul. 21, 1998  (CA) .................................... 2243761

(51) Int. Cl.
*H04L 9/00* (2006.01)
(52) U.S. Cl. .................... 380/28; 380/30; 380/252; 380/265; 380/282; 708/490; 708/491; 708/650; 708/801; 341/55
(58) Field of Classification Search ................ 380/28, 380/30, 252, 265, 282; 708/490, 491, 650, 708/801; 341/55
See application file for complete search history.

(56) References Cited
U.S. PATENT DOCUMENTS
5,197,024 A    3/1993   Pickett
(Continued)

FOREIGN PATENT DOCUMENTS
EP    0682327 A2    11/1995

OTHER PUBLICATIONS
Kocher, Paul C., "Timing Attacks on Implementations of Diffie-Hellman, RSA, DSS, and other systems", Proceedings of the Annual International Cryptology conference (Crypto), Aug. 18, 1996, pp. 104-113, vol. CONF. 16, DE, Berlin.

Primary Examiner—Emmanuel L. Moise
Assistant Examiner—Paul Callahan
(74) Attorney, Agent, or Firm—John R. S. Orange; Santosh K. Chari; Sean X. Zhang (57) ABSTRACT

A method for determining a result of a group operation performed an integral number of times on a selected element of the group, the method comprises the steps of representing the integral number as a binary vector; initializing an intermediate element to the group identity element; selecting successive bits, beginning with a left most bit, of the vector. For each of the selected bits; performing the group operation on the intermediate element to derive a new intermediate element; replacing the intermediate element with the new intermediate element; performing the group operation on the intermediate element and an element, selected from the group consisting of: the group element if the selected bit is a one; and an inverse element of the group element if the selected bit is a zero; replacing the intermediate element with the new intermediate element. In a final step, performing the group operation on the intermediate value and the inverse element if the last selected bit is a zero; and replacing the intermediate element therewith, to obtain the result, whereby each of the bits of the integral is processed with substantially equal operations thereby minimizing timing attacks on the cryptographic system.

9 Claims, 7 Drawing Sheets

U.S. PATENT DOCUMENTS

| | | | |
|---|---|---|---|
| 5,553,012 A | 9/1996 | Buss et al. | |
| 5,594,656 A | 1/1997 | Tamisier | |
| 5,600,324 A * | 2/1997 | Reed et al. | 341/176 |
| 5,623,527 A | 4/1997 | Scott | |
| 5,987,131 A * | 11/1999 | Clapp | 713/171 |
| 5,991,415 A * | 11/1999 | Shamir | 380/30 |
| 6,041,122 A * | 3/2000 | Graunke et al. | 713/168 |
| 6,175,850 B1 * | 1/2001 | Ishii et al. | 708/491 |
| 6,298,442 B1 * | 10/2001 | Kocher et al. | 713/194 |
| 6,304,658 B1 * | 10/2001 | Kocher et al. | 380/30 |
| 6,327,661 B1 * | 12/2001 | Kocher et al. | 713/193 |
| 6,366,673 B1 * | 4/2002 | Hollmann et al. | 380/28 |
| 6,381,699 B1 * | 4/2002 | Kocher et al. | 713/172 |
| 6,539,092 B1 * | 3/2003 | Kocher | 380/252 |

* cited by examiner

```
BEGIN:
    i := N              ; START FROM MSB                           L1
    Q := 0              ; INITIALIZE ACCUMULATOR                   L2
    H := 0              ; INTIALIZE STATE                          L3

LOOP:                   ; FOR ALL BITS
    Q := Q + Q          ; DOUBLE ACCUMULATOR                       L4
    IF H = 0            ; IF H STATE IS SET                        L5
        Q := Q + P      ;    ADD BASE POINT TO ACCUMULATOR         L6
        GOTO ENDLOOP    ;                                          L7
    ELSE                ; ELSE
        Q := Q - P      ;    SUBTRACT BASE POINT                   L8
        GOTO ENDLOOP    ;                                          L9

ENDLOOP:
    H := $\overline{b[i]}$         ; SET H STATE TO COMPLEMENT OF $b[i]$    L10
    i := i - 1          ; PROCESS NEXT BIT                         L11
    IF i ≥ 0            ; IF BIT EXISTS                            L12
        GOTO LOOP       ;    CONTINUE AT TOP OF LOOP               L13
    IF H = 0            ; IF EXITING FROM H = 0 STATE              L14
        Q := Q + (-P)   ;    CORRECT RESULT BY FINAL SUBTRACT      L15
    END                                                            L16
```

Fig. 4

```
BEGIN:
    i := N              ; START FROM MSB                          LL1
    Q := 0              ; INITIALIZE ACCUMULATOR                  LL2

H0:                     ; STATE ENTRY POINT
    Q := Q+Q            ; DOUBLE ACCUMULATOR                      LL3
    Q := Q+P            ; ADD BASE POINT TO ACCUMULATOR           LL4
    GOTO ENDLOOP        ; BRANCH TO END OF LOOP TESTS             LL5

H1:                     ; STATE ENTRY POINT
    Q := Q+Q            ; DOUBLE ACCUMULATOR                      LL6
    Q := Q+(-P)         ; SUBTRACT BASE POINT FROM ACCUMULATOR    LL7
    GOTO ENDLOOP        ; BRANCH TO END OF LOOP TESTS             LL8

ENDLOOP:                ; END OF LOOP TESTS
    IF b[i] = 1         ; IF CURRENT BIT IS SET                   LL9
        GOTO NEXT H0    ;   FOLLOW H0 PATH                        LL10
                        ; ELSE FALL INTO H1 PATH
NEXT H1:                ; H1 PATH
    i := i-1            ; PROCESS NEXT BIT                        LL11
    IF i > 0            ; IF BIT EXISTS                           LL12
        GOTO H1         ;   EXECUTE H1 STATE                      LL13
    Q := Q+(-P)         ; ELSE CORRECT RESULT AND END             LL14
    END                                                           LL15

NEXT H0:                ; H0 PATH
    i := i-1            ; PROCESS NEXT BIT                        LL16
    IF i > 0            ; IF BIT EXISTS                           LL17
        GOTO H0         ;   EXECUTE H0 STATE                      LL18
    END                 ; ELSE END                                LL15
```

Fig. 5

BEGIN:
   $i := N$
   $Q := 1$

H0:
   $Q := Q \cdot Q \; (Q^2)$
   $Q := Q \cdot M$
   GOTO ENDLOOP H1:
   $Q := Q \cdot Q$
   $Q := Q/M \; (Q \cdot M^{-1})$ ENDLOOP:
   IF $b[i] = 1$ GOTO ENDLOOP NEXT H1:
   $i := i - 1$
   IF $i > 0$
     GOTO H1
   $Q := Q/M$
   END NEXT H0:
   $i := i - 1$
   IF $i > 0$
     GOTO H0
   END

TIMING ATTACK RESISTANT CRYPTOGRAPHIC SYSTEM

This application is a continuation of international application number PCT/CA99/00658, filed Jul. 21, 1999 and claims the benefit of Canadian application number 2,243,761, filed Jul. 21, 1998, the content of which is incorporated herein by reference.

The present invention relates to the field of cryptographic systems and in particular to a method and apparatus for resisting timing attacks on a cryptographic system.

BACKGROUND OF THE INVENTION

Cryptographic systems generally owe their security to the fact that a particular piece of information is kept secret without which it is almost impossible to break the scheme. This secret information must generally be stored within a secure boundary, making it difficult for an attacker to get at it directly. However, various schemes or attacks have been attempted in order to obtain this secret information. One of these is the timing attack.

By way of background current public key cryptographic schemes such as RSA and elliptic curve (EC) operate over mathematical groups $F_p^*$ and $E(Fq)$ respectively. The group operations, called multiplication modulo p, in RSA, and addition of points in EC are repeated in a particular way to perform a scalar operation. In RSA the operand is called an exponent, the operation is called exponentiation and the method of multiplying is commonly known as repeated square-and-multiply. Thus given a number $a \in F_p$ and an integer $0 \leq k < p$, the exponent, whose binary representation is $k = \Sigma_{i=o}^r k_i 2^i$ a value $a^k$ mod p may be calculated by repeated use of the square-and-multiply algorithm. Similarly given $g(x) \in F_p m$ and an integer $0 \leq k \leq p^m - 1$ then $g(x)^k \mod f(x)$ may be calculated by this method.

On the other hand, in EC the operand is a scalar multiplier, the operation is called scalar multiplication of a point, and the method is known as double-and-add. Thus if $\alpha$ is a positive integer and P is an elliptic curve point then aP may be obtained by the double-and-add method. Both these methods are well known in the art and will not be discussed further.

In RSA, half of all exponentiation operations use a private key. Whereas in EC all scalar multiplications use either a long term private key or a session private key. In each of these cases, the private key is safe due to the difficulty of reversing the exponentiation or multiplication operation as the case may be. This is based on the discrete log problem the difficulty of integer factorization. As mentioned earlier, an attacker once in possession of the private key (either long term or session) is able to forge signatures and or decrypt secret messages for the attacked entity. Thus it is paramount to maintain the secrecy or integrity of the private key in the system.

Many techniques have been suggested to obtain the private key. The encryption operations are performed either in a special purpose or general purpose processor operating in a cyclic manner. Recent attack methods proposed in open literature have been based on timing analysis of these processors or in other words timing analysis of 'black box' operations. In one instance an attacker by capturing the instantaneous power usage of a processor throughout a private key operation obtains a power signature. The power signature relates to the number of gates operating at each clock cycle. Each fundamental operation as described in the preceding paragraph generates a distinct timing pattern. Other methods exist for obtaining a power signature than instantaneous power usage.

Laborious but careful analysis of an end-to-end waveform can decompose the order of add-and-double or square-and-multiply operations. Either a double or square must occur for each bit of either the exponent or scalar multiplier respectively. Therefore, the places where double waveforms are adjacent each other represent bit positions with zeros and places where there are add patterns indicate bits with ones. Thus these timing measurements can be analyzed to find the entire secret key and thus compromise the system. Thus there is a need for a system which minimizes the risk of a successful timing attack.

SUMMARY OF THE INVENTION

This invention thus seeks to provide a cryptographic system where cryptographic operations are performed by a processor in a constant period of time irrespective of the operation being performed whereby a constant amount of time is required for the processing of each bit scalar or a exponent regardless of its value.

A method for determining a result of a group operation performed an integral number of times on a selected element of the group, said method comprising the steps of:
(a) representing said integral number as a binary vector;
(b) initializing an intermediate element to the group identity element;
(c) selecting successive bits, beginning with a left most bit, of said vector and for each of said selected bits;
  (i) performing said group operation on said intermediate element to derive a new intermediate element;
  (ii) replacing said intermediate element with said new intermediate element;
  (iii) performing said group operation on said intermediate element and an element, selected from the group consisting of:
    said group element if said selected bit is a one; and
    an inverse element of said group element if said selected bit is a zero;
  (iv) replacing said intermediate element with said new intermediate element;
(d) performing said group operation on said intermediate value and said inverse element if said last selected bit is a zero; and replacing said intermediate element therewith, to obtain said result, whereby each of the bits of said integral is processed with substantially equal operations thereby minimizing timing attacks on said cryptographic system.

BRIEF DESCRIPTION OF THE DRAWINGS

These and other features of the invention will now be described by way of example only with reference the accompanying drawings in which.

DESCRIPTION OF PREFERRED EMBODIMENTS

Figure 1:
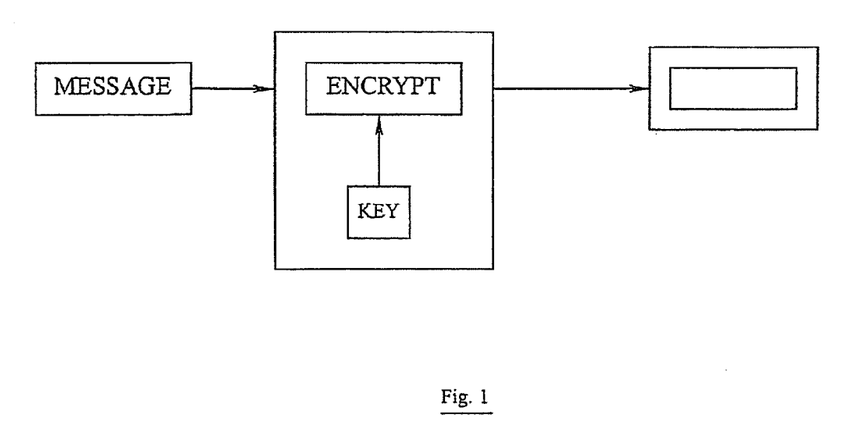
FIG. 1 is a schematic representation of a data communication system.

Referring therefore to FIG. 1, a secure data communication system 10 includes a pair of correspondents, designated as a sender A(12), and a recipient B(14), who are connected by a communication channel 16. Each of the correspondents A and B (12, 14) includes an encryption unit 18,20 respectively that may process digital information and prepare it for transmission across the channel 16.

Generally, the sender A assembles a data string, which includes amongst others the public key y of the sender, a message m, the sender's short-term public key k and signature S of the sender A. When assembled the data string may be forwarded to the intended recipient B, who then verifies the signature using A's public key. This public key information may be obtained from a certification authority (CA) 24 or sometimes is sent with the message.

For example, in RSA public key encryption, B encrypts a message m for A, which A decrypts. To encrypt the message m, B obtains A's public key (n, e) and represents the message as an integer in the interval [0, m−1]. Next B computes $c=m^e \mod n$ and sends the cipher text c to A. The entity A then recovers the message m from c by using its private key d to recover $m=c^d \mod n$. The calculation $c^d \mod n$ (modulo exponentiation) may be performed by using a well known square and multiply algorithm. Similar computations are required for signing in RSA, and for signing, encryption and decryption in discrete log systems such as ECC.

Figure 2:
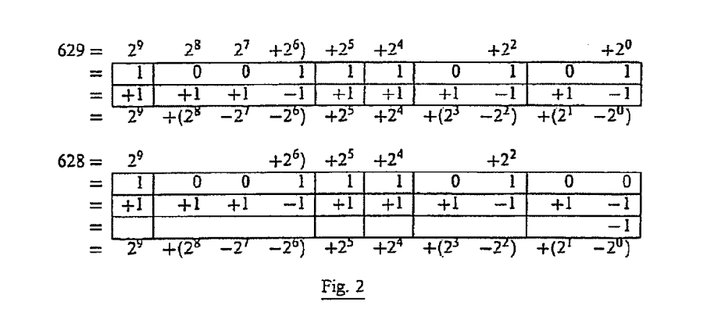
FIG. 2 is a schematic representation of a binary number recording scheme.

The values used in the computations are expressed as bit vectors, which are then manipulated by the encryption processor in accordance with a particular encryption scheme being used. Thus, referring to FIG. 2, any bit vector ending in a one can be recoded into an all non-zero vector of +1 and −1 terms. For elements ending in a zero, it is necessary to either maintain the final zero in the recoded form or to perform a further −1 action as a correction after the final zero is processed by the previous rules. As will be apparent later, it is preferable to do the corrective action.

Figure 3:
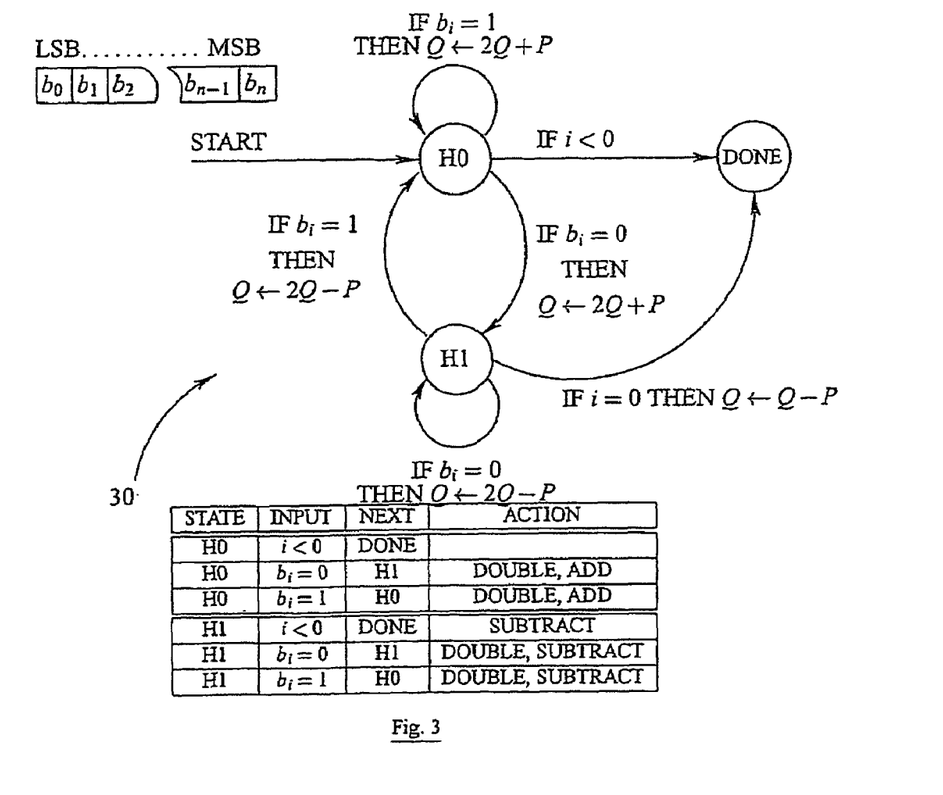
FIG. 3 is a state machine representation for compiling a scalar multiple of a point.

Referring to FIG. 3 a state machine implementation of an algorithm for computing an integer multiple b of a point P on an elliptic curve is shown generally by numeral 30. In this embodiment, a bit vector b to be processed is fed into the state machine 30. The result of the processing is the value bP where P is a point having coordinates (x,y) on an elliptic curve. The state machine 30 is initialized with a counter i set to the number of bits N in the vector b, and an intermediate value Q stored in a register. Entry into state H0 of the state machine occurs when the first bit (MSB) of b is encountered (not the first non-zero bit). In state H0 the contents of the intermediate Q is doubled and the base point P is added thereto. The bits are sequentially processed causing transitions either back to the current state H0 or to a next state H1. In state H1, Q is doubled and the base point P is subtracted. When the next bit is a zero, the next state is always H1. When the next bit is a one, the next state is always H0. Whenever the current state is H0, an add (+P) occurs, otherwise a subtract (−P) occurs. Once all bits are processed, control exits to the DONE state with the result bP. If the exit condition is encountered while in H0, it is necessary to subtract (−P) a final time from the result.

Figure 4:
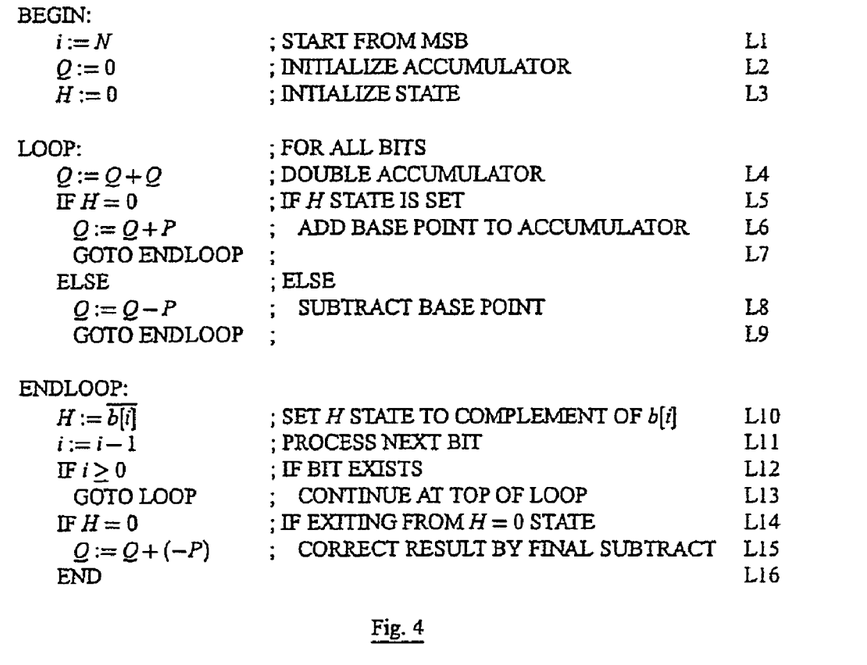
FIG. 4 is a pseudocode implementation of the state machine of FIG. 3.

Implementation of the state machine in pseudocode form requires the availability of a general purpose storage bit for the H state. FIG. 4 shows a pseudocode implementation of the state machine where general purpose data and control mechanisms are available. Timing attacks are prevented only if the execution time and power are identical for all possible execution paths through the loop. In this implementation, this requires that the time for the execution path through lines L5, L6 and L7 be the same as that through lines L5, L8 and L9. This implies that the branch instruction (IF) must execute in the same time for false and true conditionals.

Furthermore, the add and subtract operations must take the same time. By adding in the negative value of P, this is more obviously possible. Note that the execution time of all other lines in the algorithm are non-critical to the timing attack resistance, with the exception of lines L14 and L15. These two lines, if executed will increase the total time required, thus revealing that the final H state was zero. This is equivalent to revealing that the final bit of the scalar was a zero. This is unavoidable, but only reveals a single bit of the scalar multiple.

On application specific computing devices, it is likely that there are no general purpose data storage areas nor general purpose assignment and test operators. In this case, the H state control cannot be added in a usual way. Instead, it is necessary to encode the state by branching through distinct code paths.

Figure 5:
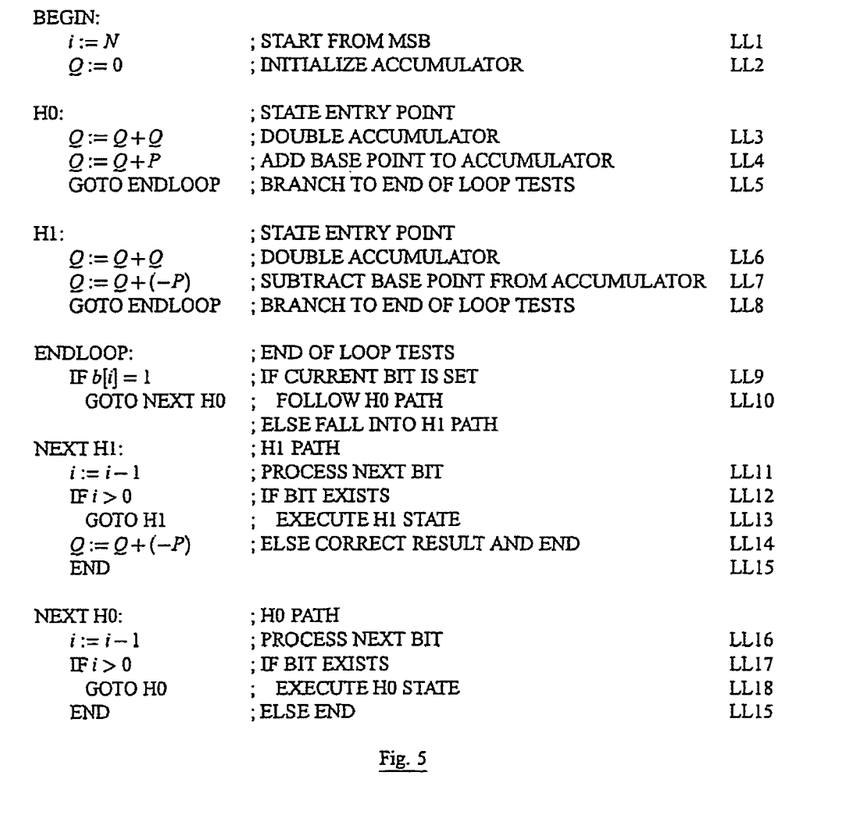
FIG. 5 is a non-state machine pseudocode implementation.

Referring to FIG. 5 shows a 'state-less' pseudocode implementation. Each code execution path corresponds to a distinct state. While this will in general cause code expansion, here there are only two short paths required. Here, as above, timing attacks are prevented only if the execution time and power are identical for all possible execution paths through the loop. In this implementation, this requires that the time for the execution path through lines LL3, LL4 and LL5 be the same as that through lines LL6, LL7 and LL8. In addition, path LL9, LL10 and LL16 must execute in the same time and power as path LL9 and LL11. This will be true in architectures where conditional branch instructions take the same time to branch (to a new location) as to fall through (to the following location). Note that lines LL11, LL12 and LL13 are equal in execution time and power to lines LL16, LL17 and LL18. This is also necessary to prevent timing attacks. Otherwise, H state information would be revealed. As in the previous implementation, a final corrective subtract is required line LL14 when the loop terminates through the H0 path. This again reveals the final H path, or equivalently the final bit of the scalar.

Figure 6:
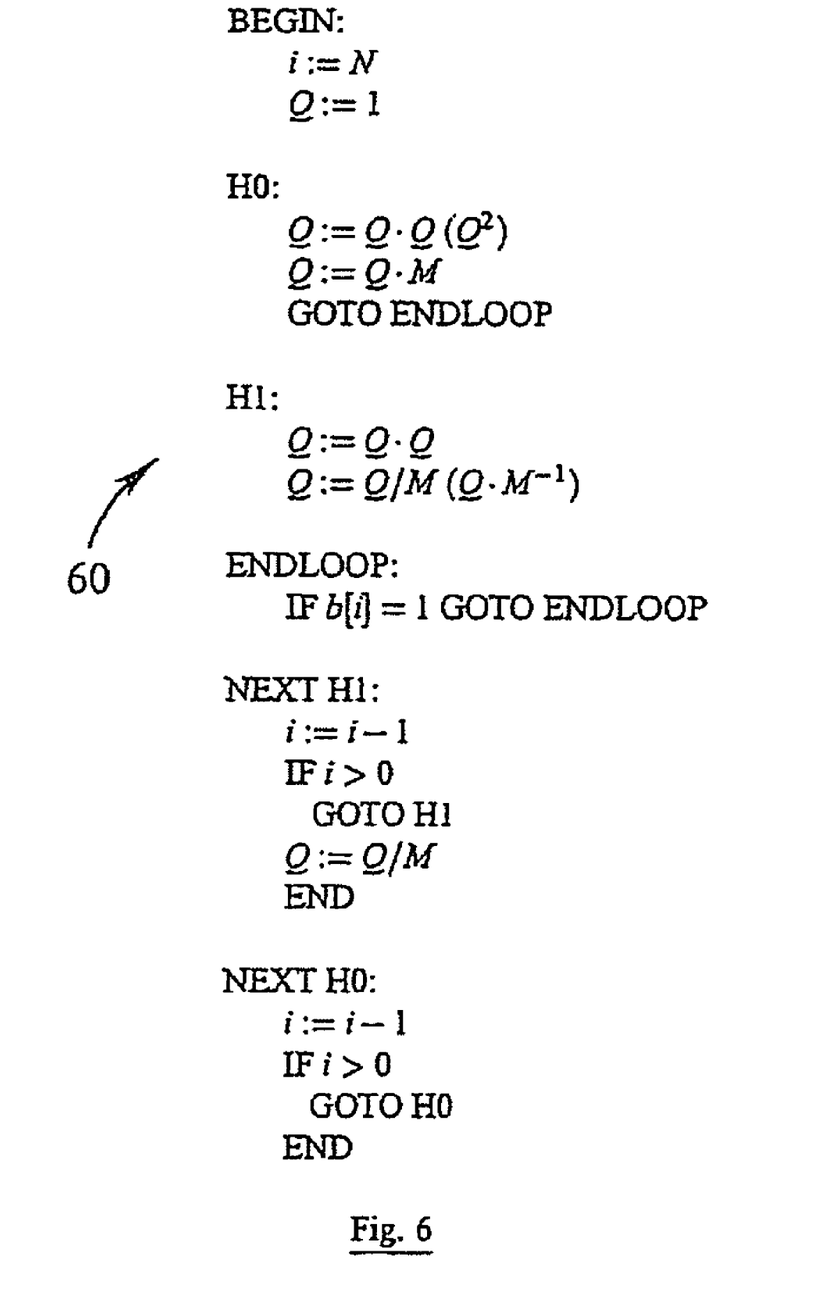
FIGS. 6 and 7 are respectively a pseudocode and state-machine implementation for a square and multiply scheme.
Figure 7:
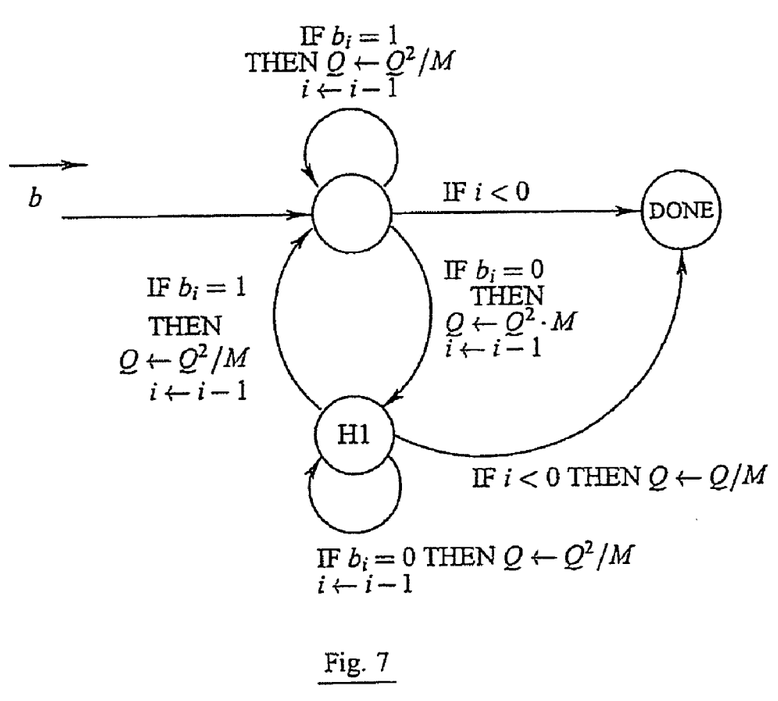

Referring to FIG. 6 a pseudocode implementation of a square and multiply operation is shown by numeral 60, while a corresponding state machine implementation is shown in FIG. 7. In this implementation, the exponent bit vector b is fed into the state machine 60. The result of the processing is to compute a value $M^b$. Once again a counter is initialized to the length N of vector b and an accumulator Q is initialized to one. Entry into state H0 of the state machine begins with the MSB of bit vector b. As previously, the bits are sequentially processed causing transitions either back to the current state H0 or to a next state H1. In state H0 the contents of the accumulator Q is squared and multiplied by the base M. In state H1 the accumulator is also squared and then divided by the base M. If the next bit is a zero, the next state is always H1, whereas if the next bit is a one the next state is always H0. Whenever the current state is H0, a multiply occurs otherwise a divide occurs. As previously, once all bits are consumed, controls exits to the DONE state. If the exit condition is encountered while in H0, it is necessary to divide a final line by the base M.

Figure 8:
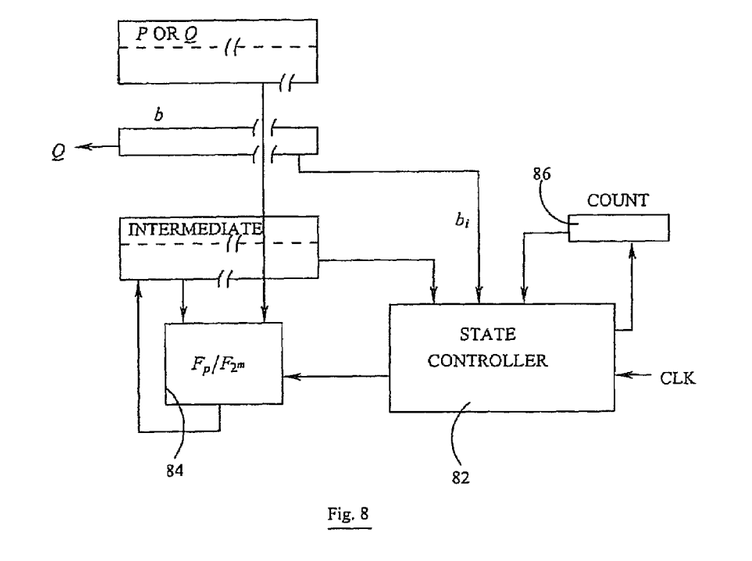
FIG. 8 is a generalized schematic diagram of an apparatus for implementing the method according to an embodiment of the invention.

FIG. 8 shows a generalized processor implementation in which a state controller 82 is programmed to run the estate code as described earlier. A modulo arithmetic and/or finite field computation unit 84 is provided for computing the square and multiplication and the point additions/subtractions respectively. A counter 86 and a register b is coupled to the state controller for timing the sequential operation of the controller 82.

While the invention has been described in connection with a specific embodiment thereof and in a specific use, various modifications thereof will occur to those skilled in the art without departing from the spirit of the invention as set forth in the appended claims.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the claims to the invention.

The embodiments of the invention in which an exclusive property or privilege is claimed are defined as follows:

1. A method of generating a result of a group operation, said method performed by a computing apparatus an integral number of times on a selected element of a group, said group having a plurality of elements including a group identity element, said method comprising the steps of:
    a) representing said integral number as a binary vector of bits having one value or another,
    b) initialising said result to that of said group identity element;
    c) selecting in sequence a predetermined number of successive bits of said vector and for each of said selected bits;
    i) performing said group operation on said result to derive a first intermediate value,
    ii) obtaining a second intermediate value by performing said group operation on said first intermediate value and said selected element when said computing apparatus is in one state and by performing said group operation on said intermediate value and an inverse of said selected element when said computing apparatus is in another state;
    iii) replacing said result with said second intermediate value,
    iv) selecting a state of said computing apparatus by examining an immediately preceding bit and maintaining the current state when said bits are of the same value and changing to said other state when said bits are different;
    d) repeating step c) for said predetermined number of said bits and performing said group operation on any remaining bits of said vector, whereby each of said predetermined bits of said of said vector is processed with similar operations, thereby inhibiting disclosure of said sequence of predetermined bits to produce said result; and
    e) outputting said result for use in subsequent computations.

2. A method as defined in claim 1, said group being a multiplicative group $F_p^*$ said group element being an integer, and said group operation being expopentiation $g^a$ and said inverse of said selected element having a value corresponding to a multiplicative inverse of said selected element.

3. A method as defined in claim 1, said group being an additive group E ($F_{2^m}$) and said group operation being addition of points.

4. A method as defined in claim 1, said group being an additive group E ($F_q$) said group element being a point P with coordinates (x,y) on an elliptic curve, and said group operation being a scalar multiple kP of said point and an inverse element being a negative –P of said point.

5. A method as defined in claim 1, said integral number being a private key k used in a cryptosystem.

6. A method of performing a selected group operation on a scalar and a selected element of a group having a plurality of elements, to generate a result, said method performed using a cryptographic processor and comprising the steps of:
    representing said scalar as a binary vector;
    recoding said binary vector to produce a signed digit representation of plus one and minus one digits;
    selecting each of said digits of said signed digit representation sequentially and for each of the selected digits performing said group operation on an intermediate element to derive a new intermediate element; and adding or subtracting a selected element of said group to said intermediate element in accordance with said signed digit representation as each digit is selected; and
    outputting said intermediate element as said result of said group operation for use in subsequent computations.

7. A method according to claim 1 wherein said group operation is performed on said result and said inverse of said selected element if said last of said predetermined bits is one of said values.

8. A method according to claim 7 wherein said predetermined number of bits represents said entire vector.

9. A method according to claim 8 wherein said one of said values is representative of zero.

* * * * *